(12) United States Patent
Takahashi

(10) Patent No.: US 10,948,720 B2
(45) Date of Patent: Mar. 16, 2021

(54) VEHICULAR DISPLAY DEVICE

(71) Applicant: Yazaki Corporation, Tokyo (JP)

(72) Inventor: Nobuyuki Takahashi, Susono (JP)

(73) Assignee: Yazaki Corporation, Tokyo (JP)

( * ) Notice: Subject to any disclaimer, the term of this patent is extended or adjusted under 35 U.S.C. 154(b) by 487 days.

(21) Appl. No.: 15/346,974

(22) Filed: Nov. 9, 2016

(65) Prior Publication Data

US 2017/0052372 A1 Feb. 23, 2017

Related U.S. Application Data

(63) Continuation of application No. PCT/JP2015/064299, filed on May 19, 2015.

(30) Foreign Application Priority Data

Jun. 12, 2014 (JP) .............................. JP2014-121228
Jun. 12, 2014 (JP) .............................. JP2014-121229

(51) Int. Cl.
*G09G 5/00* (2006.01)
*G02B 27/01* (2006.01)
*B60K 35/00* (2006.01)
*B60K 37/04* (2006.01)
*B60K 37/00* (2006.01)

(52) U.S. Cl.
CPC .......... *G02B 27/0149* (2013.01); *B60K 35/00* (2013.01); *B60K 37/00* (2013.01); *B60K 37/04* (2013.01); *B60K 2370/1529* (2019.05); *G02B 2027/0161* (2013.01); *G02B 2027/0169* (2013.01)

(58) Field of Classification Search
CPC ........................... B02B 27/0149; G06F 3/1407

USPC .................................. 345/7–8; 340/425, 436
See application file for complete search history.

(56) References Cited

U.S. PATENT DOCUMENTS 6,989,934 B2   1/2006   Aoki et al.
8,950,868 B2   2/2015   Aoki et al.
9,659,489 B2   5/2017   Kurahashi
(Continued)

FOREIGN PATENT DOCUMENTS

CN   102745084 A   10/2012
DE   10346884 A1    5/2004
(Continued)

OTHER PUBLICATIONS

International Search Report dated Jul. 28, 2015, issued for PCT/JP2015/064299.
(Continued)

*Primary Examiner* — Calvin C Ma
(74) *Attorney, Agent, or Firm* — Locke Lord LLP

(57) ABSTRACT

Provided is a vehicular display device that can prevent generation of abnormal noise from around a transmission portion. The vehicular display device includes: a display unit that is provided inside an instrument panel to project a display image; a transparent cover that allows the display image projected from the display unit to pass therethrough to a windshield; a bezel body provided with an opening portion allowing passage of the display image that has passed through the transparent cover; and a cushioning material that is provided between at least a part of an end edge of the opening portion on the bezel body and the transparent cover.

8 Claims, 6 Drawing Sheets

(56) References Cited

U.S. PATENT DOCUMENTS

| | | | | |
|---|---|---|---|---|
| 2006/0172767 | A1* | 8/2006 | Cathey, Jr. | G03B 21/00 |
| | | | | 455/556.1 |
| 2008/0088587 | A1* | 4/2008 | Pryor | H04N 9/3129 |
| | | | | 345/158 |
| 2008/0158096 | A1* | 7/2008 | Breed | B60N 2/002 |
| | | | | 345/7 |
| 2009/0248245 | A1 | 10/2009 | Sumiya et al. | |
| 2015/0042542 | A1* | 2/2015 | Fujikawa | G02B 27/0101 |
| | | | | 345/7 |

FOREIGN PATENT DOCUMENTS

| | | |
|---|---|---|
| DE | 102011055156 A1 | 5/2012 |
| DE | 102013101599 A1 | 8/2013 |
| JP | 2000-142176 A | 5/2000 |
| JP | 2007-064722 A | 3/2007 |
| JP | 2007-148092 A | 6/2007 |
| JP | 2010-076666 A | 4/2010 |
| WO | 2011/074679 A1 | 6/2011 |

OTHER PUBLICATIONS

Office Action dated Apr. 13, 2018 issued for corresponding Chinese Patent Application No. 2015 800 24311.4.

\* cited by examiner

VEHICULAR DISPLAY DEVICE

TECHNICAL FIELD

The present invention relates to a vehicular display device that is provided on an instrument panel, projects a display image onto a windshield, and allows a passenger to visually recognize a virtual image of the display image reflected on the windshield.

BACKGROUND ART

Conventionally, a head-up display (HUD) device that projects a display image from a projector provided in an instrument panel onto a windshield, reflects the projected display image on the windshield, and allows a passenger to visually recognize the reflected image as a virtual image has been proposed as a vehicular display device (for example, see Patent Literature 1). The vehicular display device described in Patent Literature 1 includes a transparent cover that is provided to an opening portion of the instrument panel for allowing a display image to pass therethrough.

CITATION LIST

Patent Literature

Patent Literature 1: JP 2007-148092 A

SUMMARY OF INVENTION

Technical Problem

However, in the conventional vehicular display device described in Patent Literature 1, the transparent cover (transmission portion) is mounted to a device body of the vehicular display device, and this device body is fixed to a component of the vehicle such as a body panel. Therefore, the transparent cover is not fixed to the instrument panel, so that the transparent cover and the instrument panel may contact each other due to running vibration or the like to generate abnormal noise. Also, when the transparent cover and the instrument panel are separated from each other to form a gap for preventing the generation of abnormal noise, a problem of intrusion of dirt or dust into the device body from the gap arises.

An object of the present invention is to provide a vehicular display device that can prevent generation of abnormal noise from around a transmission portion.

Solution to Problem

In order to solve the above problem, the vehicular display device described in a first aspect of the present invention is a vehicular display device that is provided on an instrument panel, projects a display image toward a windshield, and allows a passenger to visually recognize a virtual image of the display image reflected on the windshield, the vehicular display device comprising: a projection portion that is provided inside the instrument panel to project the display image; a transmission portion that allows the display image projected from the projection portion to pass therethrough to the windshield; a frame portion provided with an opening allowing passage of the display image that has passed through the transmission portion; and a cushioning material that is provided between at least a part of the circumferential edge of the opening on the frame portion and the transmission portion.

According to the vehicular display device in the present invention described above, the cushioning material is provided between at least a part of the circumferential edge of the opening on the frame portion and the transmission portion, whereby generation of abnormal noise caused by the contact between the circumferential edge of the opening and the transmission portion can be suppressed. Further, there is no need to separate the circumferential edge of the opening and the transmission portion from each other to form a large gap for avoiding the generation of abnormal noise, whereby the gap can be decreased. In addition, since at least a part of the gap is closed by the cushioning material, intrusion of dirt or dust into the inner side can be prevented.

The vehicular display device described in a second aspect is characterized in that, in the vehicular display device described in claim 1, the cushioning material is provided between a forward circumferential edge, which is a part of the circumferential edge of the opening and located on the transmission portion at a front side of the vehicle, and the transmission portion, and a gap between the forward circumferential edge and the transmission portion is closed by the cushioning material.

With this configuration, the cushioning material is provided between the forward end edge of the opening and the transmission portion, and the gap between the forward end edge and the transmission portion is closed by the cushioning material, whereby the intrusion of dirt or dust from the gap can be prevented. Accordingly, even when the transmission portion is provided to be inclined forward and downward toward the front side of the vehicle, the intrusion of dust or the like, which is likely to be accumulated on the front side of the vehicle along the surface of the transmission portion, can be prevented.

In addition, if a gap is formed between the forward circumferential edge and the transmission portion, this gap is reflected on the windshield and easy to be visible to a passenger as a dark reflection image, which may provide a sense of discomfort to the passenger. However, since the gap is closed by the cushioning material, a dark reflection image is hardly formed, resulting in that the sense of discomfort provided to the passenger is reduced, and visibility of the display image can be enhanced.

The vehicular display device described in a third aspect is characterized in that, in the vehicular display device described in claim 1, the cushioning material is provided between the entire circumferential edge of the opening and the transmission portion, and the gap between the entire circumferential edge of the opening and the transmission portion is closed by the cushioning material.

With this configuration, the cushioning material is provided between the entire circumferential edge of the opening and the transmission portion, and the gap between the entire circumferential edge and the transmission portion is closed by the cushioning material, whereby the intrusion of dirt or dust from the gap can more reliably be prevented.

The vehicular display device described in a fourth aspect is characterized in that, in the vehicular display device described in any one of claims 1 to 3, the frame portion is formed separately from the instrument panel, and an outer edge thereof is mounted to be contiguous to the instrument panel.

With this configuration, since the frame portion provided with the opening is provided separately from the instrument panel, there is no need to form an opening on the instrument panel, and thus, the positioning precision between the opening and the transmission portion can be enhanced, and the generation of abnormal noise can further be reduced. It is to be noted that the vehicular display device may be configured to have a frame portion and an opening on a part of the instrument panel without having a separate frame portion.

Advantageous Effects of Invention

According to the vehicular display device of the present invention, generation of abnormal noise from around the transmission portion can be suppressed, and intrusion of dirt or dust to the inside of the device from between the circumferential edge of the opening and the transmission portion can also be suppressed.

DESCRIPTION OF EMBODIMENTS

First Embodiment

Figure 1:
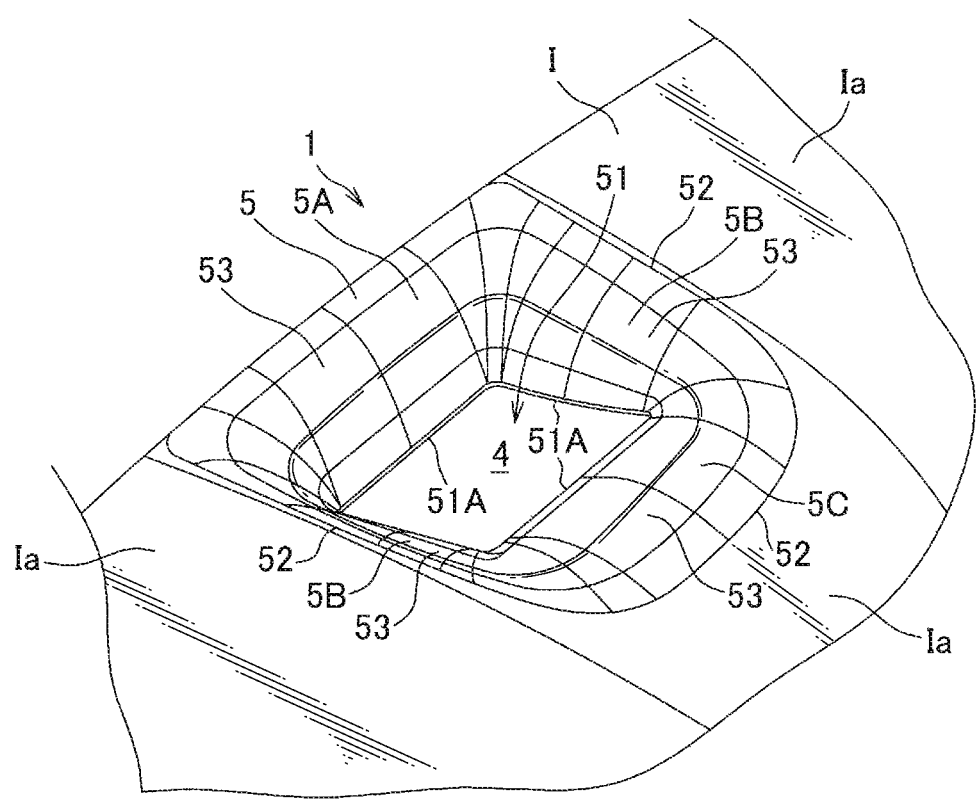
FIG. 1 is a perspective view illustrating a part of an instrument panel to which a vehicular display device according to a first embodiment of the present invention is mounted.
Figure 2:
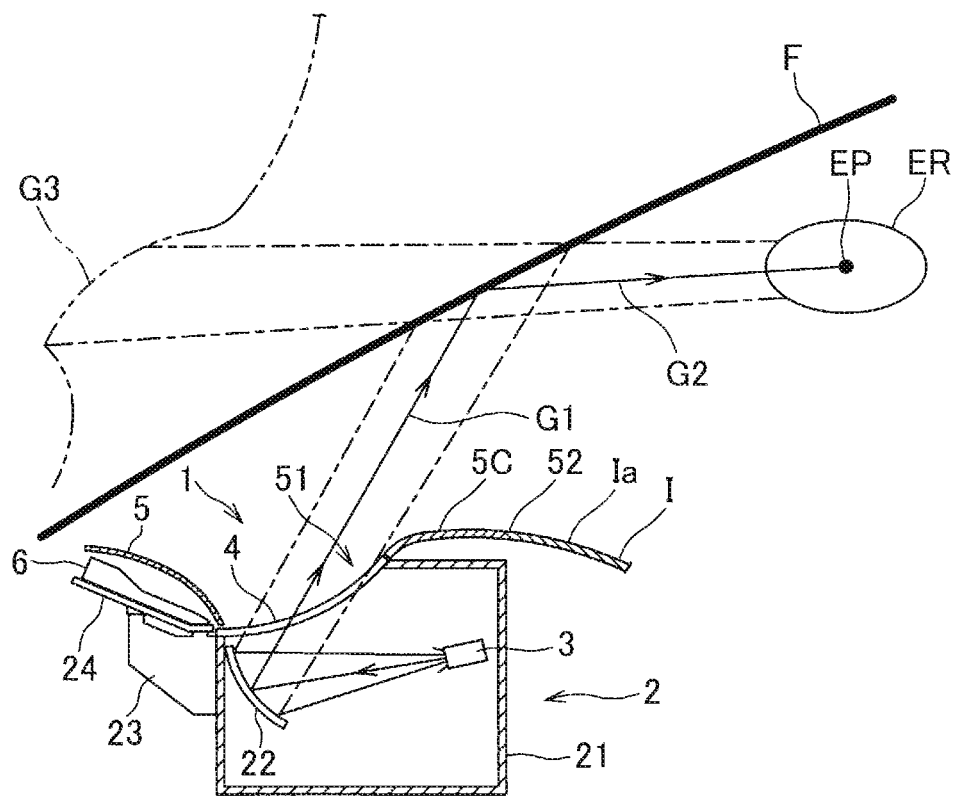
FIG. 2 is a sectional view illustrating the vehicular display device.
Figure 3:
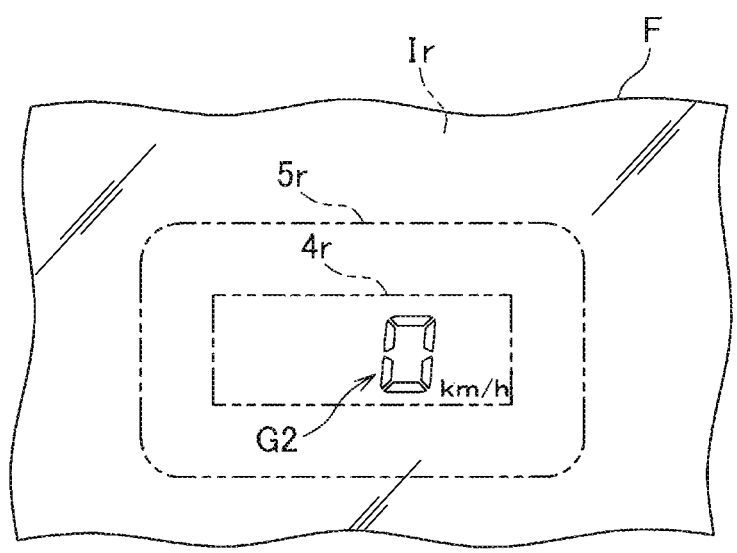
FIG. 3 is a view illustrating a display state by the vehicular display device.

The first embodiment of the present invention will be described below with reference to the drawings. As illustrated in FIGS. 1 to 3, a vehicular display device 1 according to the present embodiment is provided on an instrument panel I of a vehicle, projects a display image G1 onto a windshield F, and allows a passenger to visually recognize a virtual image G3 of the display image G2 reflected on the windshield F. Specifically, as illustrated in FIGS. 2 and 3, the display image G1 projected from the vehicular display device 1 is reflected on the windshield F to reach an eye range ER of the passenger. When the passenger sees an area in front of an eye point EP in the eye range ER, the reflected display image G2 is visible as a virtual image G3 located in front of the windshield F. Accordingly, the passenger can obtain a field of front vision through the windshield F and can visually recognize the virtual image G3 in the field of front vision.

The vehicular display device 1 includes a device body 2 provided inside the instrument panel I, a display unit 3 that is provided inside the device body 2 as a projection portion for projecting a display image, a transparent cover 4 serving as a transmission portion for allowing the display image projected from the display unit 3 to pass therethrough to the windshield F, a bezel body 5 that is provided as a frame portion having an opening portion (opening) 51 allowing passage of the display image that has passed through the transparent cover 4, and a light guide member 6 that is provided below (at the back of) the bezel body 5 at the front side of the vehicle as an irradiation unit. Note that, in the present embodiment, the obliquely upper-left side in FIG. 1 and the left side in FIG. 2 are the front side of the vehicle, and they may be merely referred to as a vehicle front side below in some cases.

The device body 2 includes a box-like housing 21, an optical unit 22 that is provided in the housing 21 to guide the display image from the display unit 3 to the transparent cover 4, and an unillustrated control unit. The housing 21 is open at the top, and the transparent cover 4 is mounted on the open portion. A support member 24 is fixed to the housing 21 at the vehicle front side through a bracket 23, and the light guide member 6 is supported by the support member 24. The housing 21 described above is fixed to the vehicle body such as a body panel of the vehicle, and not connected to the instrument panel I without being directly fixed to the instrument panel I.

The optical unit 22 includes a plurality of mirrors reflecting a display image projected from the display unit 3 and a plurality of lenses that enlarges or reduces the display image. The optical unit 22 extends the projection path of the display image G1 from the display unit 3 so as to allow the virtual image G3 visually recognized by the passenger to be focused on a distant location at the vehicle front side.

The display unit 3 has a display device that generates a display image in response to a signal from the control unit. The display device is constituted by a transmissive liquid crystal display panel, for example, and capable of displaying visible information (display image) such as numerical values, characters, and graphics. The display unit 3 is also provided with a light source for illumination such as a backlight to project the visible information displayed by the display device as a light flux.

The transparent cover 4 is a rectangular face material having translucency and having a curved surface projecting downward. The transparent cover 4 is supported by the housing 21 in the state of being inclined forward and downward toward the vehicle front side.

The bezel body 5 has an opening portion 51 at its center, and an outer edge 52 is formed to be contiguous to the instrument panel I, so that the bezel body 5 is supported by the instrument panel I. The opening portion 51 has a rectangular end edge (circumferential edge) 51A along the end edge of the transparent cover 4, and allows passage of the display image G1 that has passed through the transparent cover 4. A cushioning material 7 is provided along the entire circumference of the end edge 51A of the opening portion 51 between the end edge 51A of the opening portion 51 and the surface of the transparent cover 4. The cushioning material 7 is formed from an elastic material made of a foamable resin such as a sponge, and is adhered onto either of or both of the end edge 51A of the opening portion 51 and the surface of the transparent cover 4. On the other hand, the outer edge 52 is mounted to be contiguous to the surface Ia of the instrument panel I on the same level without having a step, so that a gap is not formed with the instrument panel I.

Figure 4:
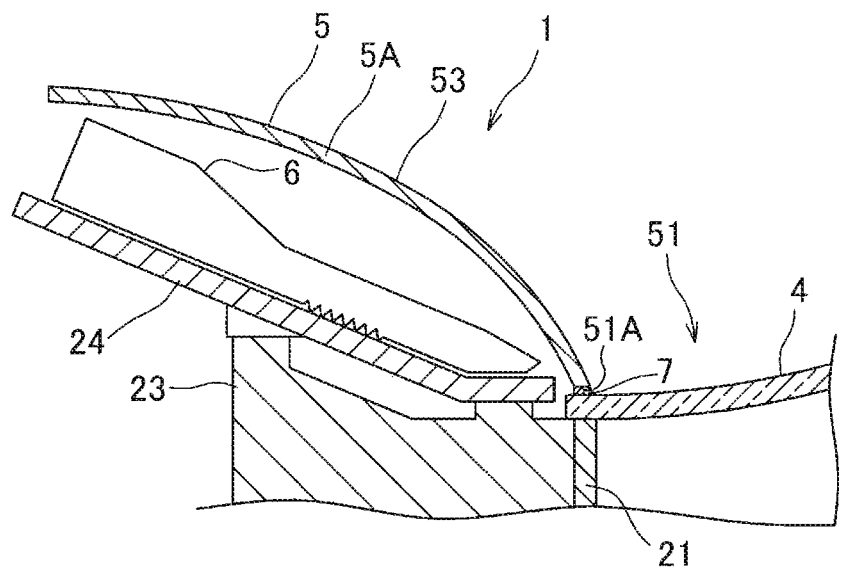
FIG. 4 is a sectional view illustrating a part of the vehicular display device as enlarged.
Figure 5:
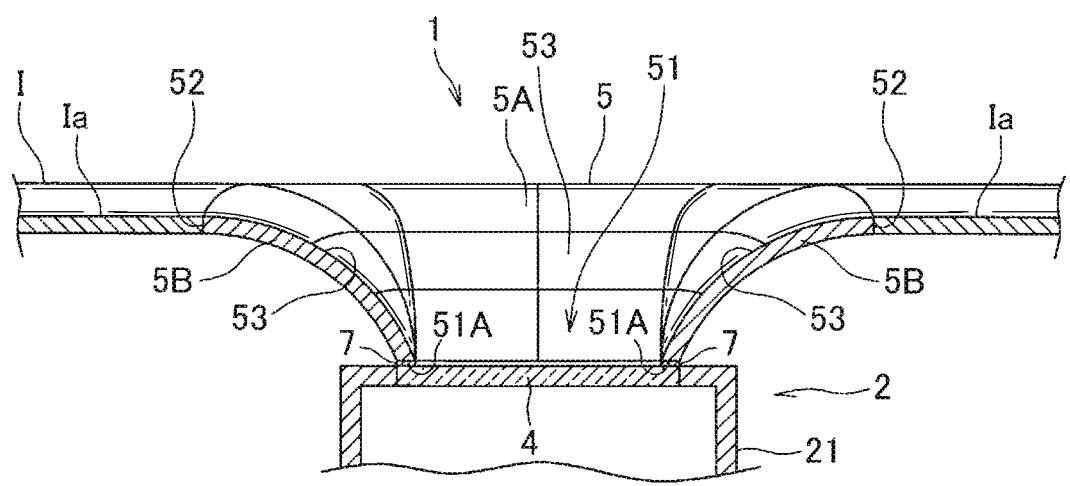
FIG. 5 is a sectional view illustrating another part of the vehicular display device as enlarged.

Further, as illustrated in FIGS. 4 and 5, the bezel body 5 has a frame surface portion 53 having a descending slope from the outer edge 52 toward the end edge 51A of the opening portion 51. This frame surface portion 53 is formed into a curved surface projecting upward with the descending slope gradually increased toward the end edge 51A of the opening portion 51 from the outer edge 52, that is, the bezel body 5 is formed into a basin-like shape in which the entire surface descends toward the opening portion 51 at the center. In addition, the bezel body 5 is formed into substantially an annular rectangular shape, in a plan view, having a front frame portion 5A located at the vehicle front side, a pair of lateral frame portions 5B located at the left and right, and a rear frame portion 5C located at the vehicle rear side.

The bezel body 5 described above is formed from a thermoplastic resin having an appropriate thickness, and is formed by injection molding, for example. It is preferable that the thermoplastic resin is a semi-translucent material that transmits light, and the transmittance after the molding is about 20%. In addition, a surface treatment similar to the one performed to the surface Ia of the instrument panel I is performed to the frame surface portion 53 of the bezel body 5. The surface treatment includes an irregularity finishing process for forming irregularities during injection molding and a coating process for coating the surface after the molding, and the frame surface portion 53 to which the surface treatment has been performed and the surface Ia of the instrument panel I are set to have the equal gloss level and color.

As illustrated in FIG. 4, the front frame portion 5A of the bezel body 5 extends toward the vehicle front side in the state of being open at the backside, and the light guide member 6 is provided below the front frame portion 5A. The light guide member 6 is a prism that reflects external light incident from the windshield F at the vehicle front side at the inner side and emits this light toward the back surface of the front frame portion 5A, and is formed to have an appropriate polygonal cross-section having a plurality of reflection surfaces by which the light to be emitted is diffused to become uniform diffusion light. Saw-toothed irregularities are formed on the bottom surface of the light guide member 6. With this, light reflected in the light guide member 6 is diffused, whereby unevenness is hardly caused in illuminance of light to be emitted to the front frame portion 5A.

The support member 24 supporting the light guide member 6 is formed from a metal plate, and is configured such that the surface close to the light guide member 6 is a mirror surface to reflect light emitted from the light guide member 6 to the light guide member 6. Since the light guide member 6 and the support member 24 are provided below the front frame portion 5A of the bezel body 5 as described above, external light incident from the windshield F is reflected and diffused inside the light guide member 6, while a part thereof is reflected by the support member 24, and emitted toward the back surface of the front frame portion 5A from the top surface of the light guide member 6 as diffusion light. The emitted diffusion light passes through the front frame portion 5A of the bezel body 5 having semi-translucency, and is emitted above the front frame portion 5A, whereby the frame surface portion 53 at the front frame portion 5A looks bright.

The cushioning material 7 is provided on the front frame portion 5A between the end edge 51A of the opening portion 51 and the transparent cover 4 to close the gap between the end edge 51A and the transparent cover 4. Therefore, the gap between the end edge 51A and the transparent cover 4 is not directly visible, and further, the boundary portion between the end edge 51A and the transparent cover 4 is dark and hardly visible to a passenger as a reflection image reflected on the windshield F illustrated in FIG. 3. Further, the gap between the end edge 51A of the bezel body 5 and the transparent cover 4, which is inclined forward and downward, at the vehicle front side is closed, whereby intrusion of dirt or dust into the instrument panel I is prevented.

As illustrated in FIG. 5, the lateral frame portion 5B of the bezel body 5 is provided such that the outer edge 52 is in contact with the instrument panel I at the left and right, and on the outer edge 52, the frame surface portion 53 of the lateral frame portion 5B and the surface Ia of the instrument panel I are contiguous without having a step. Since the frame surface portion 53 and the surface Ia of the instrument panel I are contiguous as described above, the contrast at the boundary between a reflection image Ir of the instrument panel I and a reflection image 5r of the bezel body 5, which are reflection images reflected on the windshield F as illustrated in FIG. 3, can be reduced to make them less visible.

In addition, on the lateral frame portion 5B, the cushioning material 7 is provided between the end edge 51A of the opening portion 51 and the transparent cover 4 to close the gap between the end edge 51A and the transparent cover 4. Therefore, the gap between the end edge 51A and the transparent cover 4 is not directly visible, and further, the boundary portion between the end edge 51A and the transparent cover 4 is dark and hardly visible to a passenger as a reflection image reflected on the windshield F illustrated in FIG. 3. Further, the gap with the end edge 51A of the bezel body 5 is closed, whereby intrusion of dirt or dust into the instrument panel I is prevented.

Further, the transparent cover 4 is inclined forward and downward toward the vehicle front side, and the front frame portion 5A of the bezel body 5 extends from the front edge of the transparent cover 4 with a curved surface projecting upward toward the vehicle front side. In the case where an incidence angle of external light (sunlight) is small, the external light is shielded by the front frame portion 5A so as not to reach the transparent cover 4, due to the arrangement of the transparent cover 4 and the front frame portion 5A of the bezel body 5. On the other hand, when the incidence angle (solar altitude) of external light is increased, the external light reaches the transparent cover 4, but since the incidence angle to the transparent cover 4 which is inclined forward and downward is increased, the external light reflected on the transparent cover 4 is not directed to the eye range ER, even if it is directed toward the vehicle front side and reflected on the windshield F. This can prevent the passenger from dazzling.

In the vehicular display device 1 according to the present embodiment described above, the brightness variation (contrast) between the reflection images reflected on the windshield F illustrated in FIG. 3, that is, the reflection image Ir of the instrument panel I, the reflection image Sr of the bezel body 5, and the reflection image 4r of the transparent cover 4, is less visible, so that the display image G2 is visible as standing out in the reflection image 4r of the transparent cover 4. Here, the shape of the instrument panel I and the angle or curvature of the windshield F vary according to a type of a vehicle, and among the same types of vehicles, the finishing (irregularities or color) on the surface Ia of the instrument panel I may differ. Therefore, the shape, size, material, surface treatment, and the like of the bezel body 5 and the transparent cover 4 may be set according to the individual instrument panel I or the windshield F.

The present embodiment described above provides the following effects. Specifically, since the cushioning material 7 is provided between the end edge 51A of the opening portion 51 on the bezel body 5 and the transparent cover 4, generation of abnormal noise caused by the contact between the end edge 51A and the transparent cover 4 can be suppressed. Further, there is no need to separate the end edge 51A and the transparent cover 4 from each other to form a large gap for avoiding the generation of abnormal noise, whereby the gap can be decreased. In addition, the gap is closed by the cushioning material 7, whereby intrusion of dirt or dust into the inner side can be prevented. Particularly since the gap between the end edge 51A along the entire circumference of the opening portion 51 and the transparent cover 4 is closed by the cushioning material 7, intrusion of dust or the like can be prevented.

Further, the cushioning material 7 is provided between the end edge 51A of the opening portion 51 on the front frame portion 5A and the lateral frame portion 5B, which are likely to be reflected on the windshield F, and the transparent cover 4, and this configuration prevents the boundary (gap) between the reflection image 5r of the bezel body 5 and the reflection image 4r of the transparent cover 4 from being visible to be dark as the reflection image from the windshield F, whereby such dark portion is less visible, and a sense of discomfort provided to the passenger can be reduced. Accordingly, the reflection images Ir, 5r, and 4r around the display image G2 are made less visible to reduce disparity, whereby the visibility of the virtual image G3 of the display image G2 can be enhanced. Particularly since the boundary between the end edge 51A of the front frame portion 5A, which is likely to be visible as a reflection image from the windshield F, and the transparent cover 4 is not visible to be dark, the visibility of the display image G2 can further be enhanced.

Further, even if the transparent cover 4 is provided to be inclined forward and downward toward the vehicle front side and dust or the like is easy to accumulate along the surface of the transparent cover 4 at the vehicle front side, the intrusion of dust or the like can be prevented, since the cushioning material 7 is provided between the end edge 51A at the front frame portion 5A and the transparent cover 4. In addition, when the gap is formed between the end edge 51A at the front frame portion 5A of the bezel body 5 and the transparent cover 4, light from the light guide member 6 provided below the front frame portion 5A is likely to leak from the gap. However, since the gap is closed by the cushioning material 7, the leak of light can be prevented, whereby interference to the display image G1 can be suppressed.

In addition, since the opening portion 51 is formed on the bezel body 5 which is a separate member from the instrument panel I, and the cushioning material 7 is provided between the end edge 51A of the opening portion 51 and the transparent cover 4, the precision in positioning the end edge 51A of the opening portion 51 and the transparent cover 4 can be enhanced, whereby generation of abnormal noise can further be reduced. Further, since the bezel body 5 is provided separately from the instrument panel I, the degree of freedom in the assembling procedure of the vehicular display device 1 to the vehicle can be enhanced. Further, since the device body 2 is fixed to the vehicle body such as a body panel, the device body 2 can be fixedly supported. On the other hand, since the bezel body 5 is fixed to the instrument panel I, an occurrence of step, tilt, and positional deviation on the boundary between them can be prevented, whereby the appearance of the instrument panel I can be improved.

It is to be noted that the present invention is not limited to the above embodiment, and includes other configurations by which the object of the present invention is achieved, and the modifications described below are included in the present invention. For example, in the embodiment described above, the bezel body 5 which is separately formed from the instrument panel I is used as the frame portion having an opening portion. However, the configuration is not limited thereto. The frame portion may be integrally formed as a part of the instrument panel. Further, in the above embodiment, the cushioning material 7 is provided between the end edge 51A of the opening portion 51 of the bezel body 5 and the surface of the transparent cover 4 along the entire circumference of the end edge 51A. However, the configuration is not limited thereto. The cushioning material may be provided on at least a part of the circumference of the opening. For example, the cushioning material may be provided only at the position of the front frame portion 5A along the end edge 51A, or may be discontinuously formed along the circumference of the opening.

Further, the frame portion is not limited to the one formed into a basin-like shape having a descending slope toward the opening portion 51 like the bezel body 5 in the above embodiment, and may be formed to be substantially flush with the surface of the instrument panel or may have an ascending slope toward the opening portion, not the descending slope. In addition, in the above embodiment, the transparent cover 4 serving as the transmission portion is provided to be inclined forward and downward toward the vehicle front side. However, it is not limited thereto. The transmission portion may be formed almost horizontally, maybe inclined forward and upward, or may be inclined to the left or right.

Further, in the above embodiment, the bezel body 5 serving as the frame portion is formed from a semi-translucent material to have translucency, and the light guide member 6 serving as the irradiation unit is provided below the front frame portion 5A. However, the frame portion may not have translucency, and in such case, the irradiation unit can be eliminated. Further, the irradiation unit is not limited to be provided below the front frame portion 5A. The irradiation unit may be provided below the entire bezel body 5 including the lateral frame portion 5B and the rear frame portion 5C, or may be provided below at least one of the front frame portion 5A, the lateral frame portion 5B, and the rear frame portion 5C. In addition, the irradiation unit is not limited to the light guide member 6 that allows external light to be incident thereon, to pass therethrough, to be reflected thereon, and to emit therefrom. The irradiation unit may be configured to include a light-emitting device that emits light with power and a sensor that detects external light.

Second Embodiment

A vehicular display device according to the second embodiment of the present invention will be described below. In the conventional vehicular display device described in Patent Literature 1 described above, the transparent cover that allows a display image to pass therethrough is provided at the opening portion of the instrument panel to prevent intrusion of dirt or the like inside the device. In the conventional vehicular display device described above, a reflection image formed by the reflection of the transparent cover on the windshield is more darkly visible than a reflection image formed by the reflection of the surrounding instrument panel, so that the reflection image of the transparent cover becomes conspicuous. This may provide a sense of discomfort to a passenger and entail a problem in which the visibility of the display image is likely to be deteriorated.

In view of this, the vehicular display device according to the second embodiment aims to provide a vehicular display device that can enhance visibility without providing a sense of discomfort to a passenger.

In order to solve the above problem, the vehicular display device according to the second embodiment is a vehicular display device that is provided on an instrument panel, projects a display image toward a windshield, and allows a passenger to visually recognize a virtual image of the display image reflected on the windshield, the vehicular display device comprising: a projection portion that is provided inside the instrument panel to project the display image; a transmission portion that allows the display image projected from the projection portion to pass therethrough to the windshield; and a surface portion that spreads outward in the radial direction from an opening portion allowing passage of the display image that has passed through the transmission portion, wherein the surface portion has a surface color in which brightness is gradually lowered from a position away from the opening portion toward the opening portion.

According to the vehicular display device in the second embodiment described above, a reflection image of the instrument panel, a reflection image of the surface portion, and a reflection image of the projection portion are formed from the outer side to the inner side as the reflection images reflected on the windshield, and a reflection image (virtual image) of the display image is visible in the reflection image of the projection portion. In this case, the reflection image of the surface portion having a surface color (gradation) in which the brightness is gradually lowered toward the projection portion is visible between the relatively bright reflection image of the instrument panel and the relatively dark reflection image of the projection portion. Therefore, a rapid change in the contrast between the reflection images is suppressed, whereby a sense of discomfort provided to the passenger is reduced.

In the vehicular display device according to the second embodiment, the surface portion is preferably formed into a curved surface projecting upward with the descending slope gradually increasing toward the opening portion.

According to this configuration, since the surface portion is formed into a curved surface projecting upward with the descending slope gradually increasing toward the inner opening portion, the slope at the outer edge is gentle and contiguous to the instrument panel. Thus, a rapid angular change or a step is not generated at the boundary with the instrument panel. Therefore, the change in the contrast at the boundary can be suppressed, whereby the difference between the reflection image of the instrument panel and the reflection image of the frame portion is made less visible, and a sense of discomfort provided to the passenger can further be reduced. In addition, the descending slope of the surface portion is gradually increased to be larger toward the opening portion, whereby external light is hardly impinged on the portion close to the opening portion or reflected light from this portion is hardly directed to the windshield. Accordingly, the gradation effect due to the shape in which the reflection image of the surface portion becomes darker toward the opening portion is obtained, and in combination of the gradation of the surface color, the set range of the brightness change of the reflection image from the outer edge toward the opening portion can be increased.

In the vehicular display device according to the second embodiment, the surface color is formed by performing gradation coating on the surface portion or by applying a gradation film onto the surface portion.

With this configuration, the gradation of the surface color can be formed regardless of the material of the surface portion or the member constituting the surface portion, that is, regardless of whether the surface portion is composed by the instrument panel or the frame portion. In addition, the gradation of the surface color can be formed after the vehicular display device is assembled to the vehicle, or the gradation of the surface color may be formed on the vehicular display device mounted on an existing vehicle.

The vehicular display device according to the second embodiment preferably further includes a frame portion that has the opening portion and is assembled to the instrument panel such that the outer edge is contiguous to the instrument panel, wherein the surface portion is formed on the frame portion.

With this configuration, the surface portion is formed on the frame portion having the opening portion, whereby there is no need to form the surface portion on the instrument panel. Therefore, the processing target to which the surface color is formed is limited to the frame portion, and thus, the processing labor and the processing cost can be reduced. Notably, a device that does not have a frame portion and has an opening portion formed on an instrument panel may be used as the vehicular display device. In such case, the surface portion may be constituted by a part of the instrument panel surrounding the opening portion.

It is preferable that, in the vehicular display device according to the second embodiment, the frame portion is formed into a plate-like shape by using a semi-translucent material that transmits light, an irradiation unit that emits light toward the frame portion is provided on the back of the frame portion, and the frame portion is formed such that the thickness thereof is gradually increased toward the opening portion.

According to this configuration, the irradiation unit is provided at the back of the frame portion formed by using a semi-translucent material, light emitted from the irradiation unit is transmitted toward the surface portion of the frame portion, and the thickness of the frame portion is gradually increased toward the opening portion. Therefore, the entire surface portion of the frame portion is made bright to suppress the contrast with the reflection image of the instrument panel, and the side close to the opening portion (the side close to the transmission portion) is made relatively dark, whereby the gradation effect described above can be obtained.

According to the vehicular display device in the second embodiment described above, even if there is a difference in brightness between the reflection image of the instrument panel and the reflection image of the transmission portion, which are reflected on the windshield, a rapid change in the contrast can be suppressed by the reflection image of the surface portion having a gradation of a surface color. With this, the passenger does not have a sense of discomfort, and since a natural reflection image is formed around the display image, the visibility of the reflection image (virtual image) of the display image can be enhanced.

Figure 6:
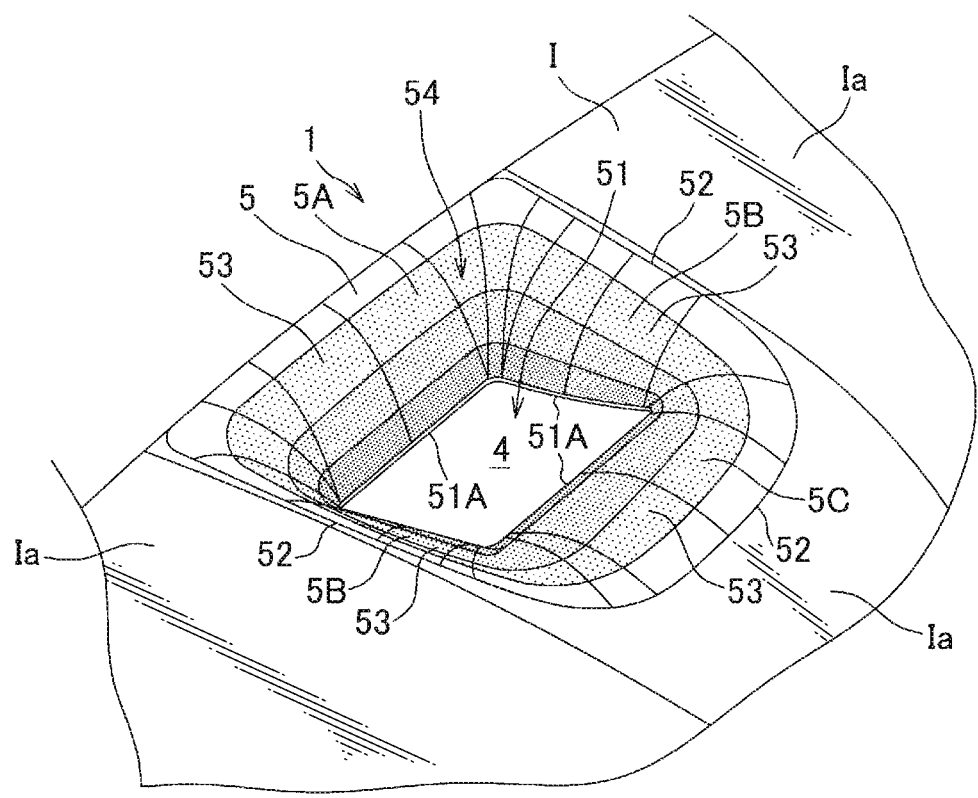
FIG. 6 is a perspective view illustrating a part of an instrument panel to which a vehicular display device according to a second embodiment of the present invention is mounted.
Figure 7:
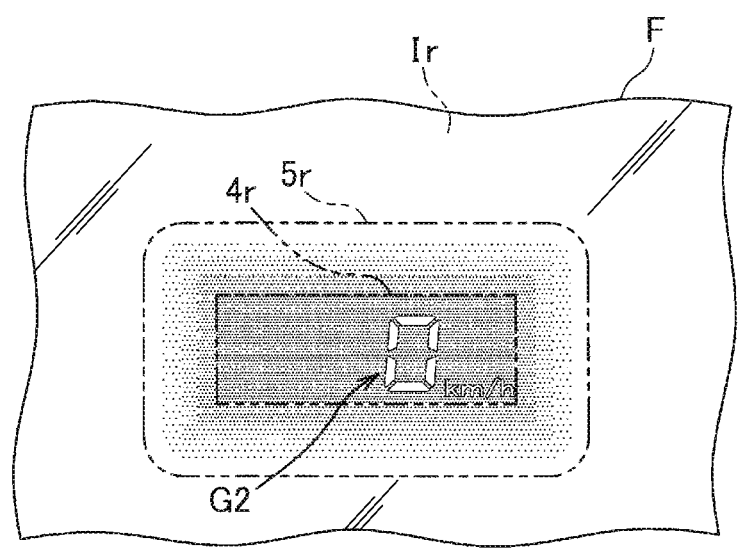
FIG. 7 is a view illustrating a display state by the vehicular display device.

The second embodiment will be described below with reference to the drawings. As illustrated in FIGS. 2, 6, and 7, a vehicular display device 1 according to the present embodiment is provided on an instrument panel I of a vehicle and projects a display image G1 onto a windshield F to allow a passenger to visually recognize a virtual image G3 of the display image G2 reflected on the windshield F. Specifically, as illustrated in FIGS. 2 and 7, the display image G1 projected from the vehicular display device 1 is reflected on the windshield F to reach an eye range ER of the passenger. When the passenger sees an area in front of an eye point EP in the eye range ER, the reflected display image G2 is visible as a virtual image G3 located in front of the windshield F. Accordingly, the passenger can obtain a field of front vision through the windshield F and can visually recognize the virtual image G3 in the field of front vision.

The vehicular display device 1 includes a device body 2 provided inside the instrument panel I, a display unit 3 that is provided inside the device body 2 as a projection portion for projecting a display image, a transparent cover 4 serving as a transmission portion for allowing the display image projected from the display unit 3 to pass therethrough to the windshield F, a bezel body 5 that is provided as a frame portion having an opening portion 51 allowing passage of the display image that has passed through the transparent cover 4, and a light guide member 6 that is provided below (at the back of) the bezel body 5 at the front side of the vehicle as an irradiation unit. Note that, in the present embodiment, the obliquely upper-left side in FIG. 6 and the left side in FIG. 2 are the front side of the vehicle, and they may be merely referred to as a vehicle front side below in some cases.

The device body 2 includes a box-like housing 21, an optical unit 22 that is provided in the housing 21 to guide the display image from the display unit 3 to the transparent cover 4, and an unillustrated control unit. The housing 21 is open at the top, and the transparent cover 4 is mounted on the open portion. A support member 24 is fixed to the housing 21 at the vehicle front side through a bracket 23, and the light guide member 6 is supported by the support member 24. The housing 21 described above is fixed to the vehicle body such as a body panel of the vehicle, and not connected to the instrument panel I without being directly fixed to the instrument panel I.

The optical unit 22 includes a plurality of mirrors reflecting a display image projected from the display unit 3 and a plurality of lenses that enlarges or reduces the display image. The optical unit 22 extends the projection path of the display image G1 from the display unit 3 so as to allow the virtual image G3 visually recognized by the passenger to be focused on a distant location at the vehicle front side.

The display unit 3 has a display device that generates a display image in response to a signal from the control unit. The display device is constituted by a transmissive liquid crystal display panel, for example, and capable of displaying visible information (display image) such as numerical values, characters, and graphics. The display unit 3 is also provided with a light source for illumination such as a backlight to project the visible information displayed by the display device as a light flux.

The transparent cover 4 is a rectangular face material having translucency and having a curved surface projecting downward. The transparent cover 4 is supported by the housing 21 in the state of being inclined forward and downward toward the vehicle front side.

The bezel body 5 has an opening portion 51 at its center, and an outer edge 52 is formed to be contiguous to the instrument panel I, so that the bezel body 5 is supported by the instrument panel I. The opening portion 51 has a rectangular end edge 51A along the end edge of the transparent cover 4, and allows the passage of the display image G1 that has passed through the transparent cover 4. The outer edge 52 is mounted to be contiguous to the surface Ia of the instrument panel I on the same level without having a step, so that a gap is not formed with the instrument panel I.

Figure 8:
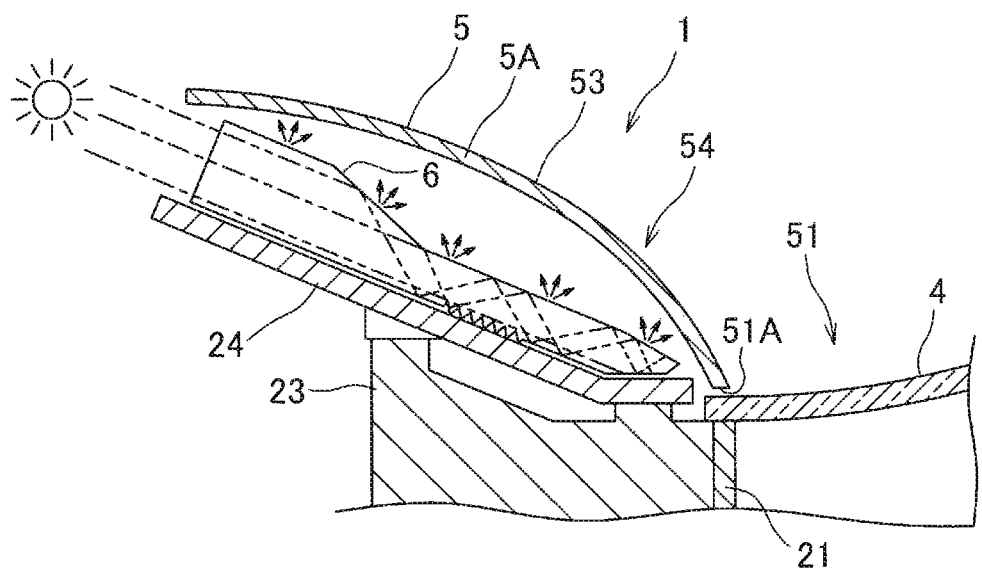
FIG. 8 is a sectional view illustrating a part of the vehicular display device as enlarged.
Figure 9:
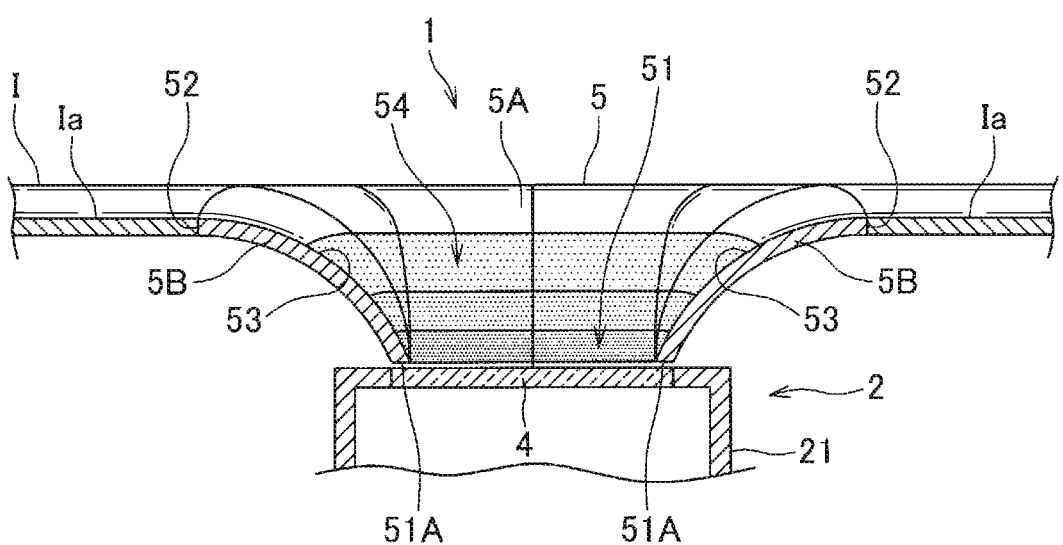
FIG. 9 is a sectional view illustrating another part of the vehicular display device as enlarged.

Further, as illustrated in FIGS. 8 and 9, the bezel body 5 has a frame surface portion (surface portion) 53 having a descending slope from the outer edge 52 toward the end edge 51A of the opening portion 51. This frame surface portion 53 is formed into a curved surface projecting upward with the descending slope gradually increased toward the end edge 51A of the opening portion 51 from the outer edge 52, that is, the bezel body 5 is formed into a basin-like shape in which the entire surface descends toward the opening portion 51 at the center. In addition, the bezel body 5 is formed into substantially an annular rectangular shape, in a plan view, having a front frame portion 5A located at the vehicle front side, a pair of lateral frame portions 5B located at the left and right, and a rear frame portion 5C located at the vehicle rear side.

The bezel body 5 described above is formed from a thermoplastic resin having an appropriate thickness, and is formed by injection molding, for example. It is preferable that the thermoplastic resin is a semi-translucent material that transmits light, and the transmittance after the molding is about 20%. Further, as illustrated in FIGS. 6 and 9, a gradation 54 in which brightness is gradually lowered from the outer edge 52 toward the end edge 51A of the opening portion 51 is provided on the frame surface portion 53 of the bezel body 5 as a surface color. The gradation 54 is formed by performing gradation coating on the frame surface portion 53 or applying a gradation film onto the frame surface portion 53.

Such gradation 54 close to the outer edge 52 has a surface color and texture equal to the color and gloss level of the surface Ia of the instrument panel I. Thus, the reflection image Ir of the instrument panel I and the reflection image Sr of the bezel body 5, which are the reflection images reflected on the windshield F illustrated in FIG. 7, have the similar brightness. Further, the brightness of the gradation 54 close to the opening portion 51 is lower than that close to the outer edge 52, that is, the gradation 54 close to the opening portion 51 has a dark color. Therefore, as the reflection images reflected on the windshield F illustrated in FIG. 7, the reflection image Sr of the bezel body 5 is visible to be gradually darker toward the reflection image 4r of the transparent cover 4 and the display image G2 at the inner side.

As illustrated in FIG. 8, the front frame portion 5A of the bezel body 5 extends toward the vehicle front side in the state of being open at the backside, and the light guide member 6 is provided below the front frame portion 5A. The light guide member 6 is a prism that reflects external light incident from the windshield F at the vehicle front side at the inner side and emits this light toward the back surface of the front frame portion 5A, and is formed to have an appropriate polygonal cross-section having a plurality of reflection surfaces by which the light to be emitted is diffused to become uniform diffusion light. Saw-toothed irregularities are formed on the bottom surface of the light guide member 6. With this, light reflected in the light guide member 6 is diffused, whereby unevenness is hardly caused in illuminance of light to be emitted to the front frame portion 5A.

The support member 24 supporting the light guide member 6 is formed from a metal plate, and is configured such that the surface close to the light guide member 6 is a mirror surface to reflect light emitted from the light guide member 6 to the light guide member 6. Since the light guide member 6 and the support member 24 are provided below the front frame portion 5A of the bezel body 5 as described above, external light incident from the windshield F is reflected and diffused inside the light guide member 6, while a part thereof is reflected by the support member 24, and emitted toward the back surface of the front frame portion 5A from the top surface of the light guide member 6 as diffusion light. The emitted diffusion light passes through the front frame portion 5A of the bezel body 5 having semi-translucency, and is emitted above the front frame portion 5A, whereby the frame surface portion 53 at the front frame portion 5A looks bright. [0064]

As illustrated in FIG. 9, the lateral frame portion 5B of the bezel body 5 is provided such that the outer edge 52 is in contact with the instrument panel I at the left and right, and on the outer edge 52, the surface of the frame surface portion 53 on the lateral frame portion 5B and the surface Ia of the instrument panel I are contiguous without having a step. Since the frame surface portion 53 and the surface Ia of the instrument panel I are smoothly contiguous as described above, the contrast at the boundary between the reflection image Ir of the instrument panel I and the reflection image Sr of the bezel body 5, which are reflection images reflected on the windshield F as illustrated in FIG. 3, can be reduced.

In the vehicular display device 1 according to the present embodiment described above, reflection images reflected on the windshield F are arranged in order of the reflection image Ir of the instrument panel I, the reflection image Sr of the bezel body 5, and the reflection image 4r of the transparent cover 4, from the outer side toward the display image G2 located at the center as illustrated in FIG. 7, and they are visible to the passenger to be gradually darker. Specifically, the brightness is gradually lowered from the reflection image Ir of the instrument panel I that is relatively brightly visible to the reflection image 4r of the transparent cover 4 that is relatively darkly visible. During the change in brightness, a rapid brightness change does not occur, and the display image G2 is visible as standing out in the relatively dark reflection image 4r of the transparent cover 4.

The brightness of each of the reflection images Ir, 5r, and 4r is set according to the combination of the shape, size, and material of each portion, such as the gloss level and color of the surface Ia of the instrument panel I, the brightness of the gradation 54 on the frame surface portion 53 of the bezel body 5, the transmittance of the bezel body 5 according to the resin material or thickness, the intensity or direction of light emitted from the light guide member 6 to the back surface of the front frame portion 5A, and the material, curvature, and tilt angle of the transparent cover 4. Here, the shape of the instrument panel I and the angle or curvature of the windshield F vary according to a type of a vehicle, and among the same types of vehicles, the finishing (irregularities or color) on the surface Ia of the instrument panel I may differ. Accordingly, the shape, size, material, or surface treatment of the bezel body 5 or the transparent cover 4 and the color and brightness of the gradation 54 are set according to the individual instrument panel I and the windshield F.

The present embodiment described above provides the following effects. Specifically, the reflection image Ir of the instrument panel I, the reflection image Sr of the bezel body 5, and the reflection image 4r of the transparent cover 4, which are the reflection images reflected on the windshield F, are visible to a passenger to be gradually darker toward the display image G2 located at the center. Therefore, the rapid change in contrast is suppressed, and any of the reflection images Ir, Sr, and 4r does not become conspicuous, whereby a sense of discomfort provided to the passenger can be reduced. Accordingly, the display image G2 is visible as standing out in the relatively dark reflection image 4r of the transparent cover 4, whereby the visibility of the virtual image G3 of the display image G2 can be enhanced.

Since the frame surface portion 53 of the bezel body 5 and the surface Ia of the instrument panel I are smoothly contiguous without having a step, the contrast change at the boundary between them can be suppressed, and a sense of discomfort in the reflection images Ir and Sr reflected on the windshield F can be reduced. Further, since the frame surface portion 53 is formed into a curved surface projecting upward and the slope at the side of the outer edge 52 is gentle, the outer edge 52 and the instrument panel I are smoothly contiguous. Thus, the brightness of the reflection image 5r of the bezel body 5 reflected on the windshield F can be slowly changed, whereby a sense of discomfort provided to the passenger can further be reduced.

In addition, the frame surface portion 53 of the bezel body 5 is gradually deeper toward the opening portion 51, whereby external light is hardly impinged on the portion close to the opening portion 51 or reflected light from this portion is hardly directed to the windshield F. Accordingly, the gradation effect due to the shape in which the reflection image Sr of the bezel body 5 becomes darker toward the opening portion 51 is obtained, and in combination of the gradation 54, the set range of the brightness change of the reflection image Sr from the outer edge 52 toward the opening portion 51 can be increased. The bezel body 5 is formed by using a semi-translucent material, the light guide member 6 is provided below the front frame portion 5A of the bezel body 5, and light emitted from the light guide member 6 passes to the surface of the front frame portion 5A to illuminate the surface of the front frame portion 5A. This configuration can prevent the reflection image of the portion of the front frame portion 5A from being excessively dark.

Since the gradation 54 is formed on the frame surface portion 53 of the bezel body 5 which is provided separately from the instrument panel I, there is no need to form a gradation on the instrument panel I, and so, the processing target on which the gradation 54 is formed is limited to the bezel body 5. Therefore, the processing labor and processing cost can be reduced. Further, since the gradation 54 is formed by performing gradation coating on the frame surface portion 53 or applying a gradation film onto the frame surface portion 53, the gradation 54 having a predetermined brightness change can be formed regardless of the material of the bezel body 5. In addition, the gradation 54 can be formed after the vehicular display device 1 is assembled to the vehicle, or the gradation 54 can be formed on the vehicular display device 1 mounted on an existing vehicle.

It is to be noted that the present invention is not limited to the above embodiment, and includes other configurations by which the object of the present invention is achieved, and the modifications described below are included in the present invention. For example, in the embodiment described above, the frame surface portion 53 of the bezel body 5 which is separately formed from the instrument panel I is specified as the surface portion. However, the configuration is not limited thereto. The surface portion may be formed on a part of the surface Ia of the instrument panel I. In this case, the bezel body 5 may be eliminated, an opening portion may be formed on a part of the instrument panel I, the surrounding of the opening portion maybe specified as a surface portion, and a surface color with brightness gradually lowered toward the opening portion may be formed.

Further, the frame portion is not limited to the one formed into a basin-like shape having a descending slope toward the opening portion 51 like the bezel body 5 in the above embodiment, and may be formed to be substantially flush with the surface of the instrument panel or may have an ascending slope toward the opening portion, not the descending slope. In addition, in the above embodiment, the transmission cover 4 serving as the transmission portion is provided to be inclined forward and downward toward the vehicle front side. However, it is not limited thereto. The transmission portion may be formed almost horizontally, maybe inclined forward and upward, or may be inclined to the left or right.

Further, in the above embodiment, the bezel body 5 serving as the frame portion is formed from a semi-translucent material to have translucency, and the light guide member 6 serving as the irradiation unit is provided below the front frame portion 5A. However, the frame portion may not have translucency, and in such case, the irradiation unit can be eliminated. Further, the irradiation unit is not limited to be provided below the front frame portion 5A. The irradiation unit may be provided below the entire bezel body 5 including the lateral frame portion 5B and the rear frame portion 5C, or may be provided below at least one of the front frame portion 5A, the lateral frame portion 5B, and the rear frame portion 5C. In addition, the irradiation unit is not limited to the light guide member 6 that allows external light to be incident thereon, to pass therethrough, to be reflected thereon, and to emit therefrom. The irradiation unit may be configured to include a light-emitting device that emits light with power and a sensor that detects external light.

Figure 10:
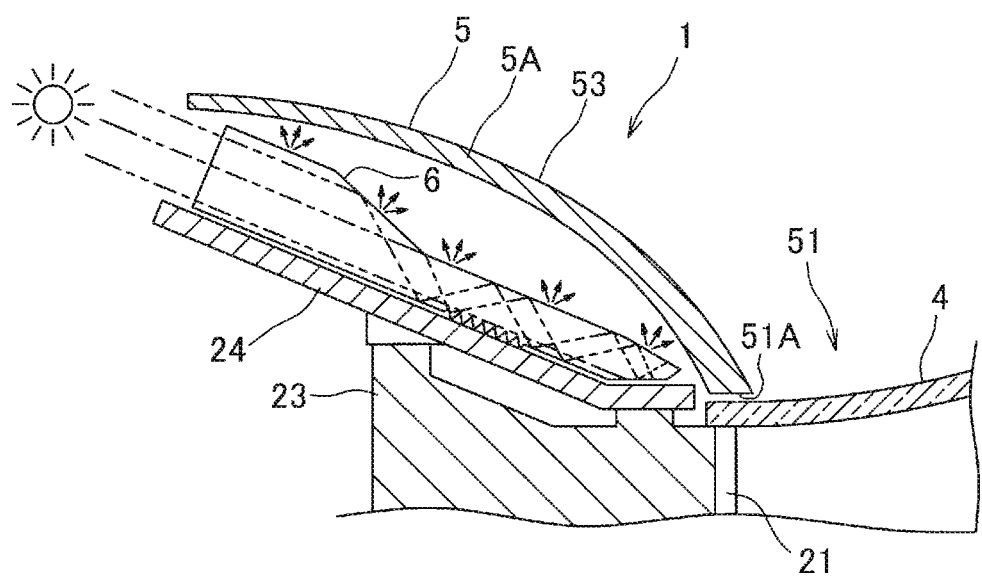
FIG. 10 is a sectional view illustrating a modification of the vehicular display device.

In addition, in the embodiment described above, the gradation 54 is formed by performing gradation coating on the frame surface portion 53 or by applying a gradation film onto the frame surface portion 53. However, the surface color of the surface portion is not limited to the one formed by coating or by using a film. The surface color may be formed by the brightness of the frame surface portion 53. As one example, the configuration illustrated in FIG. 10 can be adopted, wherein the thickness of the bezel body 5 is gradually increased toward the opening portion 51, by which the amount of light passing through the bezel body 5 is adjusted such that a lot of light passes through the outer edge 52 and the amount of light passing through the portion close to the opening portion 51 is suppressed. With this configuration, the frame surface portion 53 close to the outer edge 52 becomes relatively bright, while the frame surface portion 53 close to the opening portion 51 becomes relatively dark, that is, the brightness of the frame surface portion 53 can be gradually lowered toward the opening portion 51.

While the best configuration and method to carry out the present invention have been described above, the present invention is not limited thereto. Specifically, while the present invention has mainly been illustrated and described particularly with respect to the specific embodiment, various modifications in shapes, materials, quantities, and any other detailed configurations may be made to the above-described embodiment by those of ordinary skill in the art without departing from the technical scope and spirit of the present invention. Therefore, the description that limits the shapes, materials, and the like is only an example to facilitate the understanding of the present invention, and is not intended to limit the present invention, so that the present invention includes the description using a name without a part of or all of the limitation on the shapes, materials, etc.

REFERENCE SIGNS LIST 1 vehicular display device
2 image projector
3 display unit (projection portion)
4 transparent cover (transmission portion)
5 bezel body (frame portion)
6 light guide member (irradiation unit)
7 cushioning material
51 opening portion (opening)
51A end edge (circumferential edge of opening)
52 outer edge
53 frame surface portion (frame portion)
54 gradation (surface color)
F windshield
G1 display image
G3 virtual image
I instrument panel

The invention claimed is:

1. A vehicular display device that is provided on an instrument panel, projects a display image toward a windshield, and allows a passenger to visually recognize a virtual image of the display image reflected on the windshield, the vehicular display device comprising:
   a device body provided inside the instrument panel;
   a display unit provided inside the device body to project the display image;
   a transparent cover that allows the display image projected from the display unit to pass therethrough to the windshield;
   a frame portion provided with an opening allowing passage of the display image that has passed through the transparent cover; and
   a cushioning material provided between a part of a circumferential edge of the opening on the frame portion and the transparent cover.

2. The vehicular display device according to claim 1, wherein the cushioning material is provided between a forward circumferential edge, which is a part of the circumferential edge of the opening and located on the transparent cover at a front side of the vehicle, and the transparent cover, and a gap between the forward circumferential edge and the transparent cover is closed by the cushioning material.

3. The vehicular display device according to claim 1, wherein the cushioning material is provided between the entire circumferential edge of the opening and the transparent cover, and the gap between the entire circumferential edge of the opening and the transparent cover is closed by the cushioning material.

4. The vehicular display device according to claim 1, wherein the frame portion is formed separately from the instrument panel, and an outer edge thereof is mounted to be contiguous to the instrument panel.

5. The vehicular display device according to claim 2, wherein the frame portion is formed separately from the instrument panel, and an outer edge thereof is mounted to be contiguous to the instrument panel.

6. The vehicular display device according to claim 3, wherein the frame portion is formed separately from the instrument panel, and an outer edge thereof is mounted to be contiguous to the instrument panel.

7. The vehicular display device according to claim 1, wherein the transparent cover is mounted to the device body, and the device body is indirectly fixable to the instrument panel.

8. A vehicular display device that is provided on an instrument panel, projects a display image toward a windshield, and allows a passenger to visually recognize a virtual image of the display image reflected on the windshield, the vehicular display device comprising:

a projection portion that is provided inside the instrument panel to project the display image;

a transmission portion that allows the display image projected from the projection portion to pass therethrough to the windshield;

a frame portion provided with an opening allowing passage of the display image that has passed through the transmission portion; and a cushioning material that is provided between at least a part of a circumferential edge of the opening on the frame portion and the transmission portion, wherein the frame portion is made of semi-translucent material that transmits light, and includes a front frame portion located at the front side of the vehicle, and the front frame portion opens toward a front of a vehicle side so as to allow external light incident from the windshield to enter into a back side of the front frame portion, and the cushioning material is provided between a forward circumferential edge, which is a part of the circumferential edge of the opening and located on the transmission portion at the front side of the vehicle, and the transmission portion, and a gap between the forward circumferential edge and the transmission portion is closed by the cushioning material.

* * * * *